3,141,547
COMBINATION CONTAINER AND MICROSCOPE
SLIDE STRUCTURE
Chester A. Newby, 3450 Yosemite Ave.,
Minneapolis 16, Minn.
Filed Dec. 20, 1962, Ser. No. 246,101
1 Claim. (Cl. 206—1)

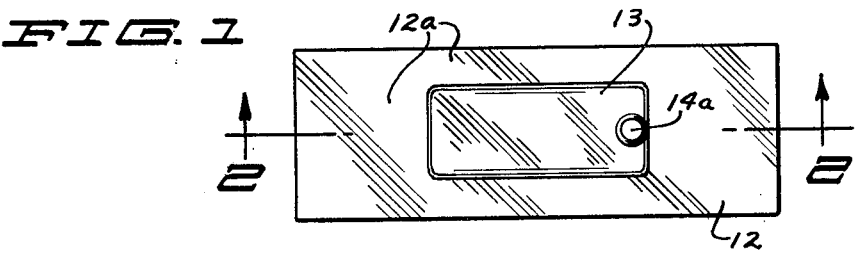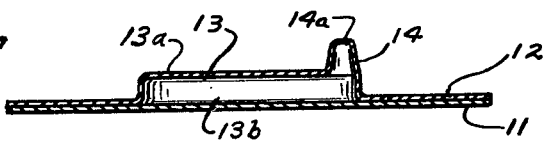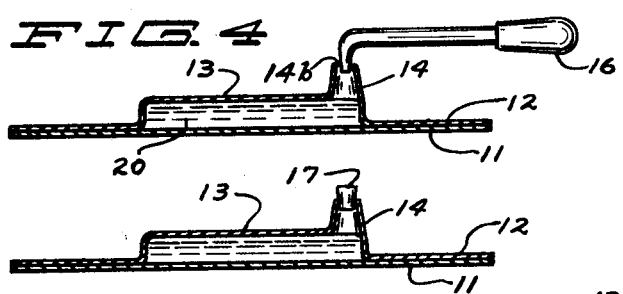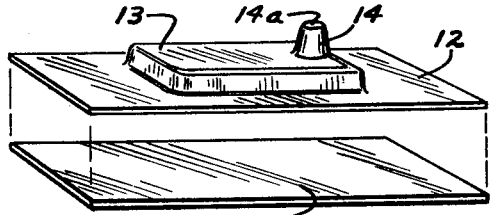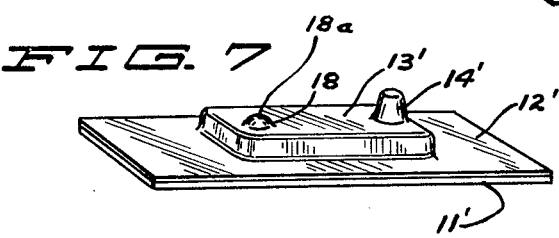
INVENTOR.
CHESTER A. NEWBY
BY
ATTORNEYS United States Patent Office 3,141,547
Patented July 21, 1964

This invention relates to a device comprising a container in the form of a miniature aquarium for microorganisms and adapted to be used as a microscope slide for the observation and study of such organisms.

It is an object of this invention to provide a device comprising a container forming a miniature aquarium, such as may be used on a field trip to receive cultures as in the form of samplings of stream and swamp water and usable as a microscope slide for the observation and study of such cultures in a laboratory.

It is another object of this invention to provide a container in the form of a miniature aquarium which is completely sealed and which has an upstanding projection of small transverse dimension to be ruptured or to have its upper end portion severed to form an inlet into said container for the introduction of a specimen of a liquid culture into said container whereby said container may be completely filled and the opened end of said projection may be readily sealed.

With reference to the above object, it is also a further object of this invention to provide a second projection upstanding from said container having a small orifice therein for the evacuation of air from said container as said container is filled with a liquid culture to avoid the presence of an air pocket within said container.

It is more specifically an object of this invention to provide a plate-like member having a projection at one side thereof forming a chamber, a small projection upstanding from said upper side of said chamber to form an inlet into said chamber, said plate member having a flange portion about said chamber and a flat base plate member underlying said chamber and said flange portion to be integral therewith to seal said chamber.

These and other objects and advantages of the invention will be fully set forth in the following description made in connection with the accompanying drawings in which like reference characters refer to similar parts throughout the several views and in which:

FIG. 1 is a plan view of applicant's device;

FIG. 2 is a view in vertical section taken on line 2—2 of FIG. 1 as indicated;

FIG. 3 is a view in perspective showing a cutting means in connection with the use of applicant's device;

FIG. 4 is a view in longitudinal vertical section of applicant's device with a filling means being shown in connection therewith;

FIG. 5 is a view similar to FIG. 4 showing a sealing member in connection with applicant's device;

FIG. 6 is an exploded view in perspective showing a separation of the plate members in connection with applicant's device; and FIG. 7 is a view in perspective showing a modification.

With reference to the drawings, applicant's device 10 may be variously formed as to its specific configuration. In the embodiment here presented, applicant's device comprises a substantially rectangular plate member 12 formed of a suitable transparent sheet material such as plastic sheet material having sufficient body and rigidity to be self-supporting, and as by the application of heat and by the use of a conventional draw process a projection 13 of a portion of said plate member 12 is formed at one side thereof comprising a chamber which is here shown to be substantially parallelepiped in form having a closed upper side 13a and an open side 13b in the plane of said plate member 12. Said plate member 12 forms a flange portion 12a which extends about the perimeter of the open end of said chamber 13.

Underlying said flange portion and the open side of said chamber to seal the same is a plate member 11 formed of a transparent material, such as of glass or plastic sheet material and said plate member is bonded to said flange portion 12a as with a suitable adhesive to be integral therewith.

Upstanding from the upper side 13a of said chamber 13 and in communication therewith is a projecting portion thereof forming a projecting inlet or nozzle 14 of relatively small cross sectional dimension and shown here being somewhat tapered and having a closed upper end or tip portion 14a.

Said projecting inlet 14 in being formed of the same material as said plate member 12 will be readily severable for the removal of the tip portion 14a as with a pair of scissors or as with a razor blade, such as the blade 15 illustrated. It will be readily understood that said tip portion 14a may also be ruptured to open the same.

With reference to FIGS. 4 and 5, when the tip portion 14a of said projecting inlet 14 has been removed, it may be inverted and reinserted as a cap or closure member or as here illustrated, a stopper 17 such as of cork or rubber may be used to close the open end 14b of said inlet.

Operation

Prior to use, the chamber 13 of applicant's device will be sealed and thus will be relatively free of any contamination.

For the insertion of specimen material into said chamber, the tip 14a of said projecting inlet 14 will be ruptured or severed. A utensil such as the eyedropper 16 illustrated is very suitable to use in securing a wet culture indicated by the character 20, such as a sampling of water from a stream or swamp and depositing the same into said chamber 13 through the open end 14b of said projecting inlet 14. Said inlet in projecting upwardly permits said chamber to be filled to its full capacity without any spilling. Said inlet 14 will then be sealed as with a stopper 17. It will also be understood that said inlet 14 may be sealed as with sealing wax or by simply having its open end pressed together with a pair of heated forceps or the like.

Thus the applicant's device functions as a miniature aquarium. When specimen material has been gathered, applicant's device will be taken to a place for observation and study, such as into a classroom or a laboratory, and in this connection the device serves as a microscope slide with observation and study of the same being had by means of a microscope.

Modification

Attention is now directed to FIG. 7 wherein a modification 10' of applicant's device 10 is shown. The portion of the structure here indicated which is identical to that above described is indicated by like characters with a prime added. The modification consists of the addition of a second projection 18 also upstanding from the upper surface of the chamber 13'. Said projection has a relatively small orifice 18a. This orifice will be of such size as to permit the passage of air, but of such small size as to effectively limit the passage of any liquid therethrough. If the culture media used is glycerin, gelatin or the like, such media has sufficient body so that the passage of this type of material through the orifice 18a may be effectively prevented.

The projection 18 with its orifice 18a represents an improvement in making possible a complete evacuation of air from the chamber 13' when specimen material is introduced therein. There may be a complete evacuation of air from the chamber 13 first above described, but the presence of the orifice 18a effectively prevents air from becoming trapped within the specimen material, such as in the form of bubbles, and thus represents a substantial improvement.

Thus it is seen that I have provided a simply constructed and very efficient combination miniature aquarium and microscope slide for the observation and study of wet cultures.

It will of course be understood that various changes may be made in the form, details, arrangement and proportions of the parts, without departing from the scope of applicant's invention which, generally stated, consists in a device capable of carrying out the objects above set forth, in the parts and combinations of parts disclosed and defined in the appended claims.

What is claimed is:

A container in the form of a miniature aquarium for microorganisms and adapted to be used as a microscope slide, said container comprising a transparent plate member having a projection at one side thereof forming a chamber, said chamber having a closed side remote from said plate member and having an open side in the plane of said plate member, said plate member having a flange portion about the open side of said chamber, a projection of small transverse dimension formed integral with the closed side of said chamber and upstanding therefrom, a transparent flat base plate member underlying said flange portion and the open side of said chamber integral with said flange portion, said integral projection being severable to form an inlet aperture in the upper end portion thereof for the passage of specimen material into said chamber, means for closing said aperture, a second projection of small transverse dimension formed integral with the closed side of said chamber upstanding therefrom and spaced from said severable projection, and said second projection having an orifice therein of such small dimension as to permit the passage of air while effectively restricting the passage of liquid therethrough.

References Cited in the file of this patent
UNITED STATES PATENTS

| | | |
|---|---|---|
| 660,782 | Strumpell | Oct. 30, 1900 |
| 1,449,292 | Nathan | Mar. 20, 1923 |
| 1,669,892 | Beck | May 15, 1928 |
| 2,616,581 | Madsen | Nov. 4, 1952 |
| 2,884,127 | Neary | Apr. 28, 1959 |
| 2,887,824 | Riva | May 26, 1959 |